US010389790B2

(12) United States Patent
Lewis et al.

(10) Patent No.: US 10,389,790 B2
(45) Date of Patent: Aug. 20, 2019

(54) AUTOMATICALLY PROVIDING MEDIA ITEMS IN ENVIRONMENTS WITH LIMITED NETWORK PERFORMANCE (71) Applicant: GOOGLE LLC, Mountain View, CA (US)

(72) Inventors: Justin Lewis, Marina del Rey, CA (US); Gavin James, Los Angeles, CA (US)

(73) Assignee: GOOGLE LLC, Mountain View, CA (US)

( * ) Notice: Subject to any disclaimer, the term of this patent is extended or adjusted under 35 U.S.C. 154(b) by 451 days.

(21) Appl. No.: 14/973,263

(22) Filed: Dec. 17, 2015

(65) Prior Publication Data
US 2017/0180448 A1    Jun. 22, 2017

(51) Int. Cl.
H04L 29/06 (2006.01)
H04L 29/08 (2006.01)
(Continued)

(52) U.S. Cl.
CPC .............. H04L 65/80 (2013.01); H04L 43/08 (2013.01); H04L 65/60 (2013.01); H04L 65/604 (2013.01);
(Continued)

(58) Field of Classification Search
CPC ......... H04L 65/60; H04L 65/80; H04L 67/42; H04L 43/08; H04L 67/04; H04L 67/06;
(Continued)

(56) References Cited

U.S. PATENT DOCUMENTS 5,802,292 A    9/1998 Mogul
6,098,064 A *  8/2000 Pirolli .................... H04L 29/06
(Continued)

FOREIGN PATENT DOCUMENTS

JP    2006041721         2/2006
JP    2006041721 A  *   2/2006
(Continued)

OTHER PUBLICATIONS

SQL Anywhere, "Cache warming," iAnywhere Solutions, Inc., 2012, 1 page [online] [Retrieved on Mar. 30, 2016] Retrieved from the Internet: <URL:http://dcx.sybase.com/1201/en/dbusage/perform-s-4988196.html>.
(Continued)

Primary Examiner — Michael C Lai
(74) Attorney, Agent, or Firm — Young Basile Hanlon & MacFarlane, P.C.

(57) ABSTRACT

A media server provides media items to clients via a network. In some instances, limited network performance of the network makes streaming or on-demand downloading of media items infeasible. In these instances, the media server automatically provides media items to clients for download as network performance allows. Media items may be provided to clients without interrupting the activities of users of the clients, and without active monitoring or watching by users. Clients may issue notifications to users when provided media items are ready for presentation, and clients may present the media items for users to consume.

19 Claims, 5 Drawing Sheets (51) Int. Cl.
*H04L 12/26* (2006.01)
*H04N 21/262* (2011.01)
*H04N 21/63* (2011.01)

(52) U.S. Cl.
CPC .............. *H04L 67/04* (2013.01); *H04L 67/06* (2013.01); *H04L 67/42* (2013.01); *H04N 21/26216* (2013.01); *H04N 21/632* (2013.01)

(58) Field of Classification Search
CPC ....... H04L 67/26; H04L 67/32; H04L 65/604; H04N 21/26216; H04N 21/632; H04N 21/24
See application file for complete search history.

(56) References Cited

U.S. PATENT DOCUMENTS

| | | | | |
|---|---|---|---|---|
| 9,438,526 | B2* | 9/2016 | Mihaly | ............... H04L 67/2847 |
| 9,912,603 | B2* | 3/2018 | Mihaly | ............... H04L 67/2847 |
| 2002/0147770 | A1* | 10/2002 | Tang | ........................ H04L 29/06 709/203 |
| 2003/0177179 | A1* | 9/2003 | Jones | ........................ H04L 29/06 709/203 |
| 2009/0227251 | A1 | 9/2009 | Lei et al. | |
| 2012/0136934 | A1* | 5/2012 | Patil | ........................ G06Q 10/10 709/204 |
| 2013/0326024 | A1* | 12/2013 | Chen | .................. H04L 65/4084 709/219 |
| 2014/0101238 | A1* | 4/2014 | Soon-Shiong | .......... H04L 67/42 709/203 |
| 2015/0106312 | A1* | 4/2015 | Chen | ..................... H04W 4/029 706/21 |
| 2015/0207730 | A1 | 7/2015 | Nishina et al. | |
| 2016/0088118 | A1* | 3/2016 | Sivasubramanian | ........................ H04L 67/2842 709/219 |

FOREIGN PATENT DOCUMENTS

| | | | | |
|---|---|---|---|---|
| JP | 2006041721 | A | * | 2/2006 |
| JP | 2006041721 | A | | 2/2006 |
| JP | 2006252370 | A | | 9/2006 |
| JP | 2014038369 | A | | 2/2014 |
| JP | 2018502687 | A | | 2/2018 |
| WO | 2013/088186 | A1 | | 6/2013 |
| WO | WO-2013088186 | A1 | * | 6/2013 ......... H04L 67/2847 |
| WO | 2014039336 | A1 | | 3/2014 |
| WO | 2014100587 | A1 | | 6/2014 |
| WO | WO-2017103798 | A1 | * | 6/2017 ............. H04L 67/06 |

OTHER PUBLICATIONS

Speed Guide, Inc., "What are 1G, 2G, 3G and 4G networks?" Frequently Asked Questions, 1999-2016, 3 pages, [online] [Retrieved on Mar. 30, 2016] Retrieved from the Internet <URL:http://www.speedguide.net/faq/what-are-1g-2g-3g-and-4g-networks-365>.

Shu, C., "YouTube Will Enable Offline Viewing on Its Mobile Apps," TechCrunch, Sep. 13, 2013, 5 pages, Can be retrieved at <URL:http://techcrunch.com/2013/09/18/879643/>.

PCT International Search Report and Written Opinion for PCT/IB2016/057593, dated Mar. 17, 2017, 9 Pages.

Notice of Preliminary Rejection from the Korean Intellectual Property Office in corresponding Korean Patent Application No. 10-2018-7007079 and its English translation, dated Jun. 12, 2019, 7 pgs.

* cited by examiner

AUTOMATICALLY PROVIDING MEDIA ITEMS IN ENVIRONMENTS WITH LIMITED NETWORK PERFORMANCE

BACKGROUND

The disclosure generally relates to providing media content for presentation on computing devices in environments with limited network performance, and more specifically to automatically downloading and storing media items on computing devices without interrupting user activities as network characteristics allow and notifying users when the media items are available for presentation.

Video streaming websites and other media servers allow users access to millions of items of media content (media items). High user engagement is an important goal of content creators, advertisers, and other affiliates of a media server. Thus, it is desired for users to watch as many videos as possible.

Many users are located in areas with limited network performance. For example, users may only have network connectivity at certain times or locations. Further, when users do have network connectivity, the network may not have sufficient bandwidth or throughput to stream (simultaneously view and download) content effectively. Consequently, watch sessions may be limited to certain times and locations when connectivity is sufficient, and some users may be unable to consume media items at all. This results in a sub-par user experience and can cause users to abandon watch sessions.

The Figures (FIGS.) and the following description relate to example embodiments by way of illustration only. It should be noted that from the following discussion, alternative embodiments of the structures and methods disclosed herein will be readily recognized as viable alternatives that may be employed without departing from the principles of what is claimed.

DETAILED DESCRIPTION

I. Configuration Overview

A media server provides media items to clients via a network. In some instances, limited network performance of the network makes streaming or on-demand downloading of media items infeasible. In these instances, the media server may automatically provide media items to clients as network performance allows. Media items may be provided to clients without interrupting the activities of users of the clients, and without active monitoring or watching by users. Clients may issue notifications to users when provided media items are ready for presentation, and clients may present the media items for users to consume.

The media server may detect one or more characteristics indicating limited network performance of the network. A media distribution module of the media server may automatically select a media item to provide to a client as network performance allows. A command module of the media server may issue a download command to a client to automatically download and store a media item. The command module may additionally issue a notification command to the client to issue a notification when the media item is ready for presentation on the client. The media distribution module of the media server may retrieve the media item from a media data store, and provide the media item to the client as network performance allows.

A media player application of the client receives one or more commands from the media server instructing the client to automatically download and store a media item and issue a notification when the media item is ready for presentation on the client. The client automatically downloads and stores media items in a client media data store as network performance allows. Receiving commands and downloading and storing media items occurs automatically as a background process without interrupting user activities or requiring user monitoring. A notification module of the client issues notifications when media items are ready for presentation on the client. The media player application presents the media item on the client responsive to receiving a request from a user of the client to present the media item.

II. Computing Environment

Figure 1A:
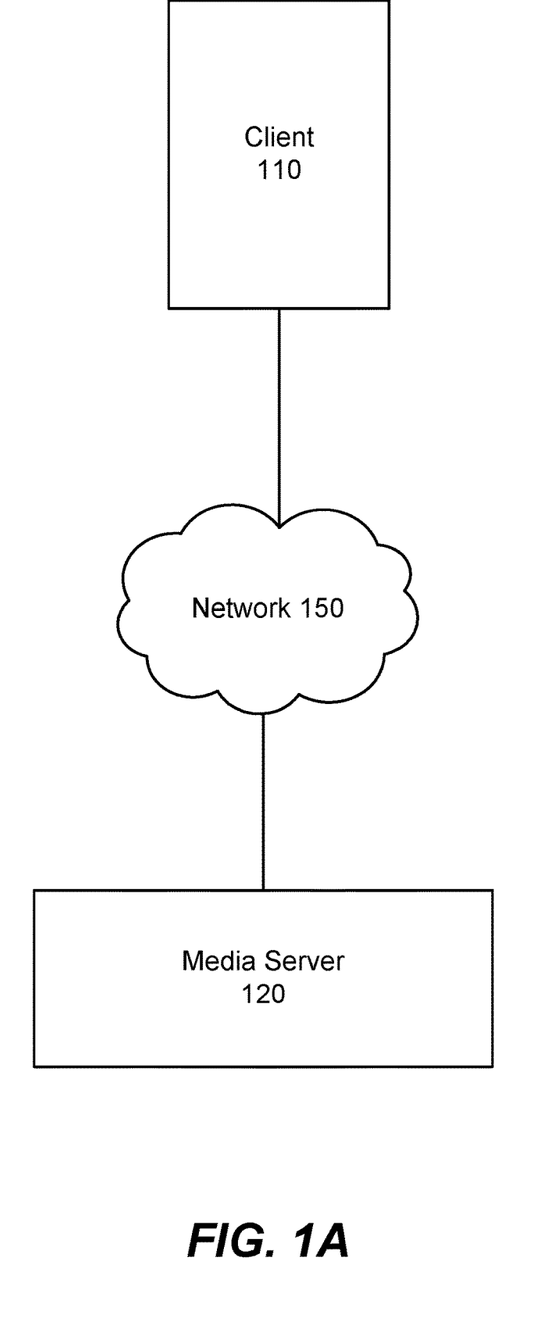
FIG. 1A illustrates a computing environment for providing media items to clients in environments with limited network performance and notifying users of the clients that media items are ready for presentation on the client, according to one embodiment.

FIG. 1A illustrates a computing environment for providing media items to clients 110 in environments with limited network performance and notifying users of the clients that media items are ready for presentation on the client, according to one embodiment. The environment includes a client computing device 110 connected by a network 150 to a media server computer 120. FIG. 1 illustrates one client 110 and one media server 120, but there may be multiple instances of each of these entities. For example, there may be thousands or millions of clients 110 in communication with multiple media servers 120.

The network 150 may comprise any combination of local area and/or wide area networks, the internet, or one or more intranets, using both wired and wireless communication systems. In various embodiments, the network performance of the network 150 may be limited by characteristics of the network or the client 110. Limited network performance may be characterized by bandwidth limitations, throughput limitations, latency, jitter, and error rate. Limited network performance may be caused by characteristics of the network 150, for example, if the network is a low-bandwidth wired network, a cellular network such as 2G, 3G, EDGE, a low quality WIFI network, or a wireless network provided by a satellite or aircraft. Limited network performance may also be caused by characteristics of the client 110, for example, if the client has limited network connection capabilities, is located in an area with poor network reception, or is located a sizable distance from a network hub that is providing the network access.

As a result of limited network performance, media items cannot be provided to the client quickly enough for streaming or on-demand downloading. For example, the media item cannot be downloaded fast enough to maintain the required rate of display (frame rate) for the client to provide the media so that the user can consume it (e.g., view, listen, or both) in an uninterrupted fashion. To provide media items to clients 110 in environments with limited network performance, the media server 120 may provide a media item to the client automatically as network performance allows, and the client 110 may download and store the media item in the background, and when the media item is downloaded, issue a notification to the user indicating that the media item is ready for presentation.

II.A. Example Media Server

Figure 1B:
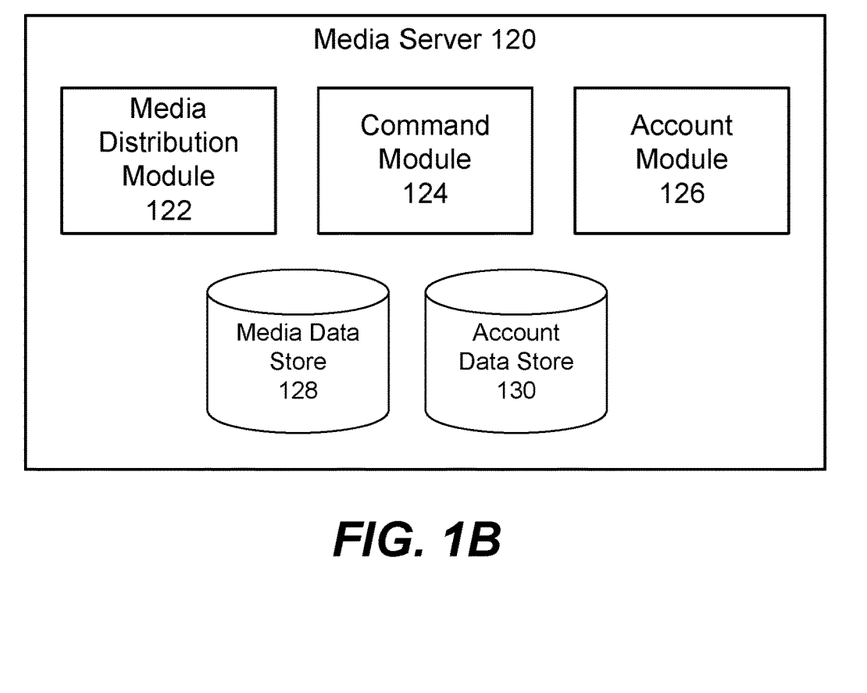
FIG. 1B illustrates a media server for providing media items to clients in environments with limited network performance, according to one embodiment.

FIG. 1B illustrates a media server 120 for providing media items to clients 110 in environments with limited network performance, according to one embodiment. The media server 120 includes one or more computer servers that provide media items to clients 110. The media server 120 may, for example, be a video streaming website (e.g., YouTube®). Media items may be of different types (e.g., video media items or audio media items, etc.), formats (4:3 aspect ratio, 16:9 aspect ratio, etc.), and be encoded/compressed using different techniques (H.264, MPEG, etc.). Media items may include advertisements. Media items may be stored in a media data store 128 of the media server 120. Depending upon the embodiment, the media data store 128 may include one or more types of non-transitory computer-readable persistent storage media.

The media server 120 maintains information relating to media items, for example, in media data store 128. Information relating to a media item may include a media item identifier (ID), a media item address, and metadata associated with a media item. The media item ID uniquely identifies a media item. The media item address is a computer network address where the media item is physically stored and may be downloaded or streamed from. The physical storage location of the media item may be a specific instance of the media server 120 that is located in a geographic region that is proximate to a subset of the clients 110 associated with the media server 120. For example, there may be multiple separate instances of the media server 120, one located in Japan, another in China, another in India, and so on. The metadata describes different aspects of the media item. The metadata may include, for example, author, date of publishing, reviews, genre information, publisher, ratings, and a media item identifier. For advertisements, information relating to the media item may further include advertisement information, including parameters for serving the ads to particular users based on stored user information.

An account module 126 within the media server 120 allows users to manage accounts with the media server 120. The account module 126 further receives and stores user information corresponding to a user's activities related to the media server 120. User information may include information about client devices 110 associated with a user (e.g., type of device, network characteristics and capabilities, device location, device storage information, etc.), identifiers of media items provided to one or more clients 110 associated with the user, user preferences, and playback data associated with the user, including view counts and ratings for provided media items. User information may further comprise notification preferences, as defined and discussed below with respect to FIG. 1C. User information and other account information may be stored in an account data store 130 of the media server 120. Depending upon the embodiment, the account data store 130 may include one or more types of non-transitory computer-readable persistent storage media.

A media distribution module 122 provides media items to clients 110. The media distribution module 122 receives media item requests from clients 110 and retrieves media items from the media data store 128 to provide to clients. The media distribution module 122 may provide media items to clients 110 for streaming and concurrent presentation or for download and storage for later presentation. In situations with limited network performance, the media distribution module 122 provides media items to clients 110 automatically. The media distribution module 122 may automatically select media items based on user information, such as previously provided media items and user preferences. The selected media items may be automatically provided to and stored by clients 110 as a background process occurring without a request by a user, and without the user actively watching or monitoring the process. The user may be notified when the media item is ready for playback, as discussed in more detail below with respect to FIGS. 1C and 3.

To determine the method for providing media items to client 110, the media distribution module 122 may analyze the network characteristics of the client 110 and network 150 to determine whether the client 110 is capable of streaming and concurrently presenting the media item. This may occur on an ongoing basis or at specific intervals. The media distribution module 122 may prepare media items for sending to clients 110. Preparing a media item may include, for example, encoding, compressing, changing media item formats, and changing data structure (e.g., dividing into packets for streaming or downloading). The preparation may vary depending upon the method used to provide the media items to the client. For example, in high bandwidth situations, a higher quality encoding and compression scheme may be used, whereas in limited bandwidth situations, a lower quality encoding and compression scheme may be used.

As discussed above, the media distribution module 122 may automatically select media items to provide to clients 110 in situations with limited network performance. The media distribution module 122 may select the media item based on user information of the user of the client 110, such as previously consumed media items, media item ratings, or other preferences. For example, if a user has previously watched and rated highly media items in a certain genre, a media item from the genre may be selected. The media item may also be selected using other information stored on the media server 120, such as user information of other users (e.g., in the same geographic area, similar users, etc.) or advertisement information. The media item may also be selected based on user preferences stored in an account data store 130 indicating, for example, certain preferred genres or other preferred characteristics for selected media items.

A command module 124 of the media server 120 generates and sends commands to clients 110. Commands are instructions sent to clients 110 by the media server 120 that, for example, direct clients 110 to automatically download and store selected media items and issue notifications to users of clients 110. Commands are useful for providing media items to clients 110 in limited network situations so that media items can be automatically downloaded in the background on clients 110 without bothering the users until the downloads are complete. Notifications may, for example, indicate to a user that a media item has been downloaded is ready for presentation, and are discussed in more detail below with respect to FIGS. 1C, 2, and 3. By downloading in advance without the user's express input for particular media items and notifying them only when they are already downloaded to their device, the media server 120 is able to provide an improved media consumption experience to the user that is not as hindered by limited network availability.

II.B. Example Client Computing Device

Figure 1C:
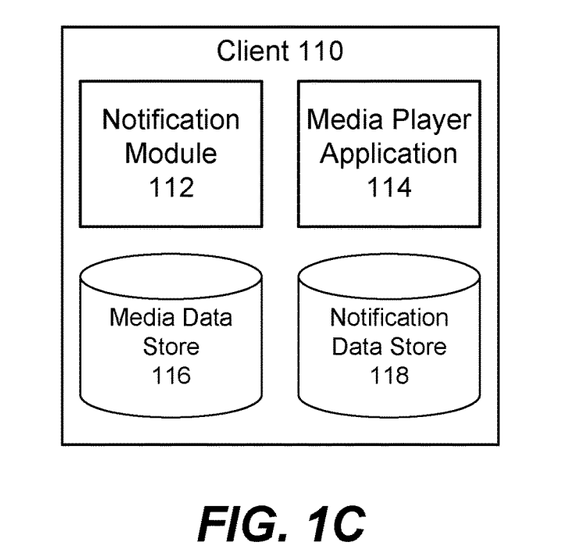
FIG. 1C illustrates an example client computing device for downloading and storing media items and issuing notifications, according to one embodiment.

Clients 110 are computing devices that execute computer program instructions—e.g., a web browser, e-book reader, media player, or other client software applications—which allow a user to consume audio and/or video media item data. A client 110 might be, for example, a personal computer, a tablet computer, a smart phone, a laptop computer, a dedicated e-reader including at least audio playback functionality, or other type of network-capable device such as a networked television or set-top box.

FIG. 1C illustrates an example client computing device 110 for downloading and storing media items and issuing notifications, according to one embodiment. A media player application 114 presents media items received from the media server 120 to a user of the client. The media player application 114 may be a software application executed by a processor of the client 110 for presenting media items to a user operating the client 110. The media player application 114 may execute in conjunction with an operating system of the client 110. In one embodiment, the media player application 114 is a dedicated software application designed to work specifically with the media server 120. In another embodiment, the media player application 114 is provided via a more general application for accessing many types of content, such as a web browser. The browser may provide access to the media server 120, for example, via a web interface.

The media player application 114 sends request messages to the media server 120 to request media items for presentation on the client 110 and receives media items from the media server in response. A request message may be sent, for example, responsive to a user input indicating that user wants to consume a specified media item. In this embodiment, the media item may be streamed from the media server 120 and displayed concurrently on the client 110.

As discussed above with respect to FIG. 1A, in some situations, concurrent streaming and display of a media item is infeasible due to limited network performance. To allow a user of the client 110 to consume a media item when concurrent streaming and display is infeasible, the media player application 114 may automatically download and store a selected media item and notify the user when the media item is ready for presentation. As discussed above with respect to FIG. 1B, the automatic downloading occurs as a background process on the client 110 without the user specifically requesting the download or actively watching or monitoring the downloading process. As a result, a user's activities on the client 110 are not interrupted or changed by the automatic downloading.

In one embodiment, the automatic downloading begins on the client 110 when the media player application 114 receives a download command to download the media item from the media server 120. The media player application 114 automatically sends a request message to the media server 120 without user input. The download command may specify when or under what circumstances the client should download the media item. The download command may direct the client to automatically download and store the media item at a particular time, under particular network conditions, after other media items are downloaded, after media items have been consumed, or according to conditions specified by the user. A user may specify that the client only downloads media items if the client 110 is connected to a WIFI network, and not if the client is connected to a cellular data network. The media item is downloaded from the media server 120 according to the download command as network performance allows (e.g., as network connectivity or bandwidth is available) and stored locally in the media data store 116. As stated above, the download and storage of the media item may occur as a background process not visible to the user of the client 110.

A notification module 112 issues notifications to the user when a downloaded media item is ready for presentation on the client 110. Notifications may contain text, images, or software constructs to notify a user that a media item is available for presentation. Types of notifications may include text messages (e.g., SMS messages), emails, native device messages (e.g., iMessages), device notifications (e.g., push notifications, badges, sounds, etc.), and messages within software applications of the client 110 or other computing devices. Notifications may also contain hyperlinks such as Uniform Resource Locators (URLs) that allow the user of the client 110 to navigate to the media player application 114 within an operating system of the client.

The notification module 112 may issue notifications responsive to receiving a notification command from the media server 120 or according to notification conditions. Notification conditions specify when or under what circumstances the notification module 112 issues a notification. For example, notification conditions may specify that a notification is issued when the download of the media item is complete, when a specified percentage of the media item is downloaded (e.g., 25%, 50%, 75%, etc.), or if the client 110 is in a certain geographic area. The notification conditions may be based on one or more characteristics of the network 150, including network type and download speeds. For example, the conditions may specify that the notification may be issued when the media player application 114 determines that enough of the media item has been downloaded and the media item is downloading at a sufficient pace such that the media item may be presented without interruption.

The notification module 112 may modify notification conditions based on a user's expressly input notification preferences. Notification preferences may specify the type(s) of notification a user receives, times that notifications may be issued, notification conditions, notification sounds, and notification display characteristics (e.g., whether the device screen turns on, how the notification is displayed on the device, etc.). Notification preferences may be selected by a user by, for example, a user interface of the media player application 114 or another user interface of the client 110 such as a settings application of an operating system. There may be default notification preferences that apply if a user has not selected one or more notification preferences. Notification preferences may be specific to a client 110 or may apply to multiple clients 110 associated with a user and may be stored in the notification data store 118 or in the account data store 130.

Notification content, notification conditions, and notification preferences may be received by the notification module 112 from the media server 120 (e.g., as part of a command), or the media player application 114 and stored in the notification data store 118. Notification preferences may also be sent to the media server 120 and stored in the account data store 130 so that they can be disseminated to all clients 110 associated with a user's account.

III. Media Server Activities

Figure 2:
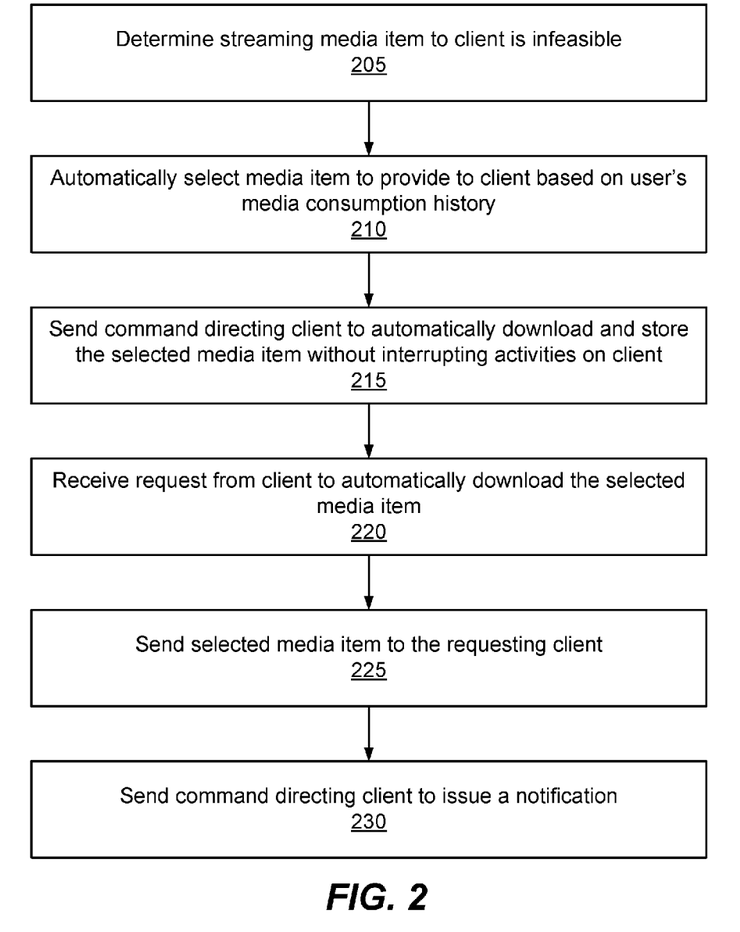
FIG. 2 is a flowchart of the steps for an example process performed by a media server to provide a media item to a client in an environment with limited network performance.

FIG. 2 is a flowchart of the steps for an example process performed by a media server to provide a media item to a client in a environment with limited network performance. The media server 120 analyzes the network conditions and determines 205 that streaming the media item to the client 110 is infeasible. The media server 120 then selects a media item to automatically provide to the client 110. The media server 120 sends 215 a download command directing the client 110 to automatically download and store a selected media item without interrupting the user's activities on the client. The media server 120 receives 220 a request from the client 110 to download the selected media item. The media server 120 then sends 225, as network conditions permit, the selected media item to the client 110 over a period of time. The media server 120 sends 230 an additional notification command directing the client 110 to issue a notification to the user of the client. The notification notifies the user that the media item is ready for playback, and is issued on the client 110 when it is determined that the media item is ready for playback, according to notification conditions. Accordingly, the user's activities on the client 110 are not interrupted or changed until the media item is ready for playback so that the user experience is not affected or interrupted, for example, by waiting for downloads.

In another embodiment, the command of step 215 includes both a download command and a notification command, and may include notification content, notification conditions, or notification preferences. As a result, the command of step 230 may be unnecessary because the command of step 215 contains the information for directing the client 110 to issue a notification.

IV. Client Activities

Figure 3:
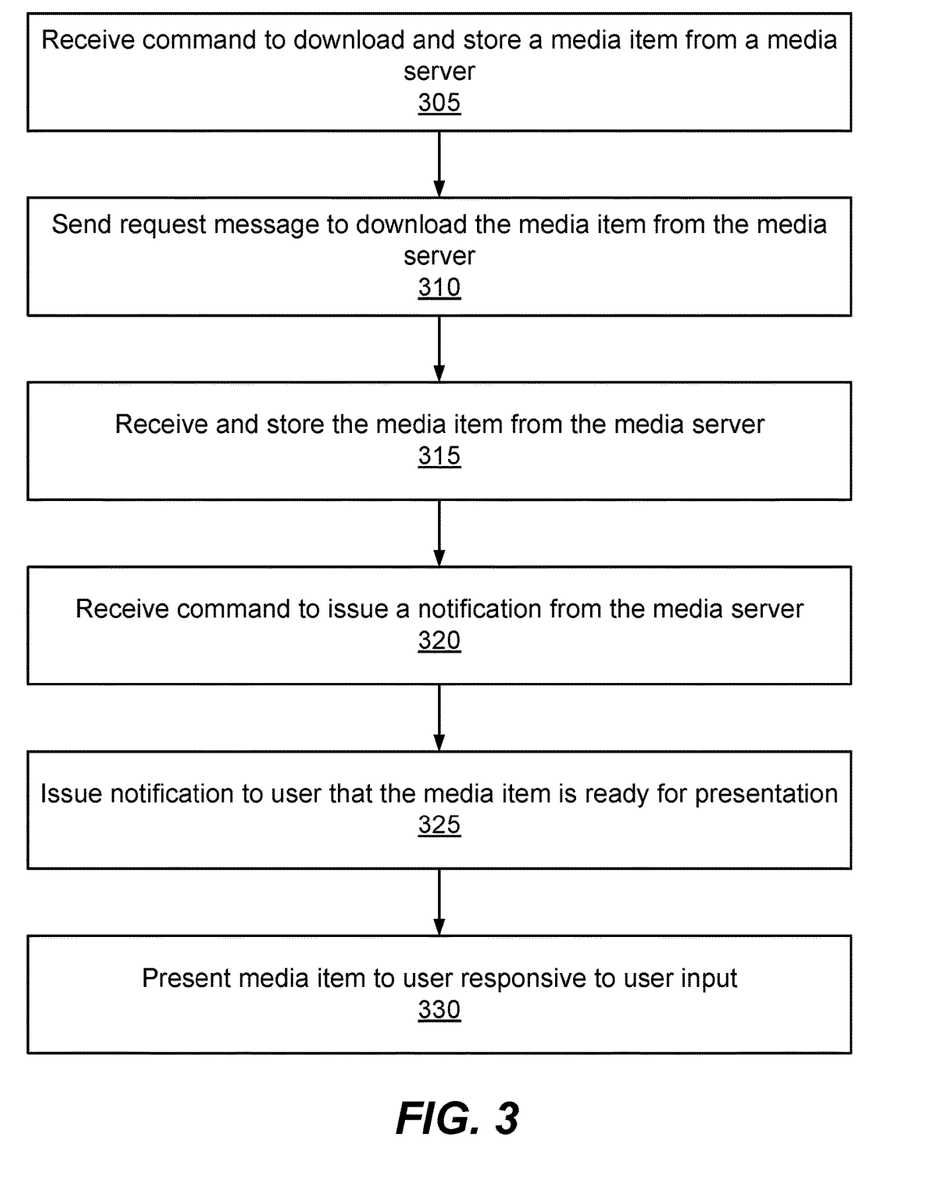
FIG. 3 is a flowchart of the steps for an example process performed by a client to receive a media item for presentation and issue notifications to a user of the client accordingly in an environment with limited network performance.

FIG. 3 is a flowchart of the steps for an example process performed by a client to receive a media item for presentation and issue a notification to a user of a client in an environment with limited network performance. The client 110 receives 305 a download command to automatically download and store a selected media item from a media server 120. The client 110 then automatically sends 310 a request to the media server 120 to download the media item. The client 110 receives 315 the media item from the media server 120 and stores the media item on the client without interrupting the activities on the client. The client 110 downloads the media item from the media server 120 as network conditions allow. The client 110 receives 320 an additional command directing the client to issue a notification to the user of the client.

In another embodiment, the command of step 305 includes both a download command and a notification command, and may include notification content, notification conditions, or notification preferences. As a result, the command of step 320 may be unnecessary because the command of step 305 contains the information for directing the client 110 to issue a notification.

The client 110 issues 325 a notification that indicates to the user that the media item is ready for presentation. The user may begin presentation of the media item, for example by interacting with the notification. Responsive to receiving a user input to initiate presentation of the media item, the client 110 presents 330 the media item to the user.

VI. Additional Considerations

Figure 4:
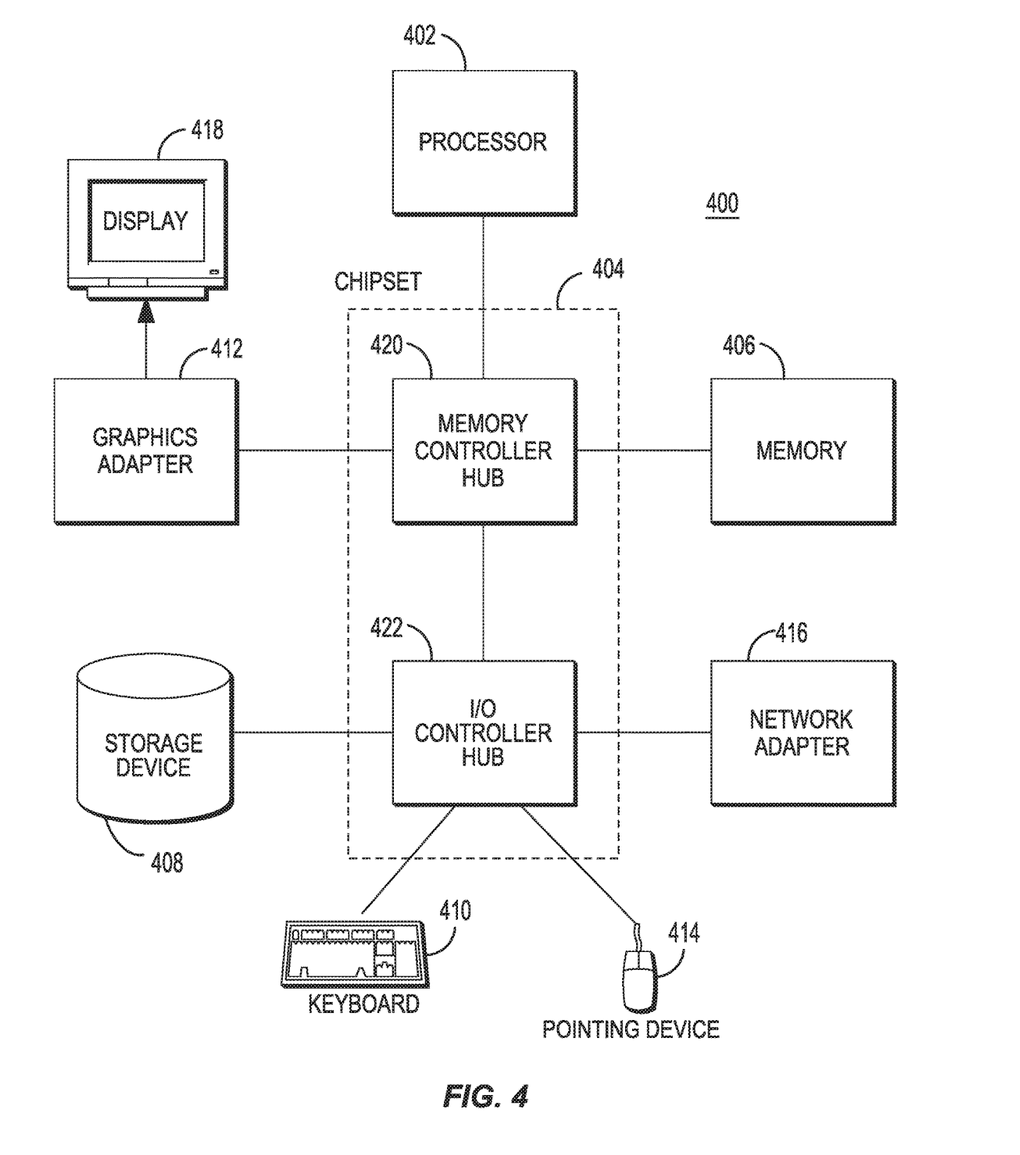
FIG. 4 is a high-level block diagram illustrating physical components of a computer used as part or all of one or more of the entities described herein in one embodiment.

FIG. 4 is a high-level block diagram illustrating physical components of a computer 400 used as part or all of one or more of the entities described herein in one embodiment. For example, instances of the illustrated computer 400 may be used as the client 110 or the media server 120. Illustrated are at least one processor 402 coupled to a chipset 404. Also coupled to the chipset 404 are a memory 406, a storage device 408, a keyboard 410, a graphics adapter 412, a pointing device 414, and a network adapter 416. A display 418 is coupled to the graphics adapter 412. In one embodiment, the functionality of the chipset 404 is provided by a memory controller hub 420 and an I/O controller hub 422. In another embodiment, the memory 406 is coupled directly to the processor 402 instead of the chipset 404. In one embodiment, one or more audio output device is coupled to chipset 404.

The storage device 408 is any non-transitory computer-readable storage medium, such as a hard drive, compact disk read-only memory (CD-ROM), DVD, or a solid-state memory device. The memory 406 holds instructions and data used by the processor 402. The pointing device 414 may be a mouse, track ball, or other type of pointing device, and is used in combination with the keyboard 410 to input data into the computer 400. The graphics adapter 412 displays images and other information on the display 418. The network adapter 416 couples the computer system 400 to a local or wide area network.

As is known in the art, a computer 400 can have different and/or other components than those shown in FIG. 4. In addition, the computer 400 can lack certain illustrated components. In one embodiment, a computer 400 may lack a keyboard 410, pointing device 414, graphics adapter 412, and/or display 418. Moreover, the storage device 408 can be local and/or remote from the computer 400 (such as embodied within a storage area network (SAN)).

As is known in the art, the computer 400 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 408, loaded into the memory 406, and executed by the processor 402.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like.

It will be understood that the named components represent one embodiment, and other embodiments may include other components. In addition, other embodiments may lack the components described herein and/or distribute the described functionality among the components in a different manner. Additionally, the functionalities attributed to more than one component can be incorporated into a single component.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments described is intended to be illustrative, but not limiting, of the scope of what is protectable, which is set forth in the following claims.

What is claimed is:

1. A method for downloading and storing a media item on a client device connected to a network with limited network performance, the method comprising:
   receiving at the client device, a command from a media server, the command directing, when executed by the client device, the client device to download and store a media item selected based on user information associated with media items consumed by a user of the client device, the command sent to the client device responsive to detecting that the network has a characteristic consistent with limited network performance, the network connecting the media server and the client device;
   downloading the media item from the media server to the client device responsive to the client device executing the command, the downloading occurring automatically without the user's express input for downloading the media item and as a process that does not interrupt user activities on the client device; and
   issuing, in response to an issuing command from the media server, by the client device, a notification, based on a notification preference of the user, on the client device indicating that the media item is ready for presentation on the client device.

2. The method of claim 1, wherein the characteristic consistent with limited network performance is at least one of limited bandwidth, limited throughput, latency, jitter, and error rate.

3. The method of claim 1, wherein issuing the notification comprises determining that a specified percentage of the media item has been downloaded from the media server and issuing the notification responsive to the determining.

4. The method of claim 1, wherein issuing the notification comprises determining that the client device is within a specified geographic area and issuing the notification responsive to the determining.

5. The method of claim 1, further comprising receiving a second command from the media server directing the client device to issue the notification, wherein the second command is the issuing command such that the notification is issued responsive to receiving the second command.

6. The method of claim 1, wherein the command from the media server comprises a second part specifying notification conditions, and the issuing the notification occurs according to the notification conditions.

7. The method of claim 1, wherein a rate of throughput of data passing from the media server to the client device via the network is slower than a required rate for streaming and concurrently presenting the media item on the client device.

8. The method of claim 1, further comprising:
   receiving a request from the user of the client device to initiate presentation of the media item; and
   presenting the media item on the client device.

9. A method for providing a media item to a client device connected to a network with limited network performance, the method comprising:
   detecting, by a media server, that the network has a characteristic consistent with limited network performance, the network connecting the media server and a client device, and responsive to the detecting:
      automatically selecting, by the media server, a media item to provide to the client device based on user information associated with media items consumed by a user of the client device; and
      sending, by the media server, a command to the client device, the command directing, when executed by the client device, the client device to download and store the media item without a user's express input for downloading the media item;
   receiving, by the media server from the client device, a request to download the media item by the client device executing the command;
   sending, by the media server, the media item to the client device responsive to the request; and
   sending, by the media server and based on a notification preference of the user, a second command to the client device, the second command directing the client device to issue a notification indicating that the media item is ready for presentation on the client device.

10. The method of claim 9, wherein a rate of throughput of data passing from the media server to the client device via the network is slower than a required rate for streaming and concurrently presenting the media item on the client device.

11. The method of claim 9, wherein the characteristic consistent with limited network performance is at least one of limited bandwidth, limited throughput, latency, jitter, and error rate.

12. The method of claim 9, wherein a rate of throughput of data passing from the media server to the client device via the network is slower than a required rate for streaming and concurrently presenting the media item on the client device.

13. The method of claim 9, wherein the command from the media server comprises a second part directing the client device to issue a notification indicating that the media item is ready for presentation on the client device.

14. The method of claim 13, wherein the second part of the command directs the client device to issue the notification responsive to the client device determining that a specified percentage of the media item has been downloaded from the media server.

15. A non-transitory computer readable storage medium storing instructions for downloading and storing a media item on a client device connected to a network with limited network performance, the instructions when executed by a processor configured to cause the processor to:
   receive at a client device, a command from a media server, the command directing, when executed by the client device, the client device to download and store a media item selected based on user information associated with media items consumed by a user of the client device, the command sent to the client device responsive to detecting that the network has a characteristic consistent with limited network performance, the network connecting the media server and the client device;
   download the media item, from the media server, to the client device responsive to the client device executing the command, the downloading occurring automatically without the user's express input for downloading the media item and as a process that does not interrupt user activities on the client device;
   responsive to an issuing command from the media server, issue a notification on the client device indicating that the media item is ready for presentation on the client device.

16. The non-transitory computer readable storage medium of claim 15, wherein the characteristic consistent with limited network performance is at least one of limited bandwidth, limited throughput, latency, jitter, and error rate.

17. The non-transitory computer readable storage medium of claim 15, wherein issuing the notification comprises determining that a specified percentage of the media item has been downloaded from the media server and issuing the notification responsive to the determining.

18. The non-transitory computer readable storage medium of claim 15, wherein issuing the notification comprises determining that the client device is within a specified geographic area and issuing the notification responsive to the determining.

19. The non-transitory computer readable storage medium of claim 15, wherein a rate of throughput of data passing from the media server to the client device via the network is slower than a required rate for streaming and concurrently presenting the media item on the client device.

* * * * *